(12) United States Patent
Davydov et al.

(10) Patent No.: US 9,590,713 B2
(45) Date of Patent: Mar. 7, 2017

(54) USER EQUIPMENT AND METHODS FOR CSI ENHANCEMENTS USING INTERFERENCE CANCELLATION AND SUPPRESSION RECEIVERS

(71) Applicant: Intel Corporation, Santa Clara, CA (US)

(72) Inventors: Alexei Davydov, Nizhny Novgorod (RU); Gi Wan Choi, San Jose, CA (US); Gregory Morozov, Nizhny Novgorod (RU); Vadim Sergeyev, Nizhny Novogorod (RU); Ilya Bolotin, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 14/573,164

(22) Filed: Dec. 17, 2014

(65) Prior Publication Data
US 2015/0373732 A1    Dec. 24, 2015

Related U.S. Application Data

(60) Provisional application No. 62/015,903, filed on Jun. 23, 2014.

(51) Int. Cl.
*H04L 1/00* (2006.01)
*H04B 7/06* (2006.01)
*H04L 5/00* (2006.01)

(52) U.S. Cl.
CPC ......... *H04B 7/0632* (2013.01); *H04B 7/0628* (2013.01); *H04L 5/00* (2013.01)

(58) Field of Classification Search
CPC ........ H04J 3/10; H04J 3/11; H04J 3/12; H04J 3/13; H04W 72/04; H04W 72/05; H04W 72/06
USPC .......................... 370/329, 201, 330, 341, 348
See application file for complete search history.

(56) References Cited

U.S. PATENT DOCUMENTS

2016/0080963 A1\*  3/2016  Marinier ............... H04L 5/0053
                                                              370/252

FOREIGN PATENT DOCUMENTS

WO    WO-2015199869 A1    12/2015

OTHER PUBLICATIONS

"CSI enhancement for NAICS", Alcatel-Lucent, (May 10, 2014), 1-3.
"Discussion on CQI enhancement for NAICS", Intel Corporation, (May 10, 2014), 1-5.
"Discussion on CSI feedback for NAICS receivers", Mediatek Inc, (May 10, 2014), 1-6.

(Continued)

*Primary Examiner* — Dady Chery
(74) *Attorney, Agent, or Firm* — Schwegman Lundberg & Woessner, P.A.

(57) ABSTRACT

In providing feedback to an eNB in an LTE network for downlink scheduling and link adaptation, a UE issues a channel state information (CSI) report that includes a channel quality index (CQI). The reported CQI should include all UE receiver processing capabilities, including NAICS (network assisted interference cancellation and suppression) capability to cancel and suppress interference. Described are measures that may be taken to provide more accurate reporting of CSI by a terminal with NAICS capability.

16 Claims, 2 Drawing Sheets

(56) References Cited

OTHER PUBLICATIONS

"International Application Serial No. PCT/US2015/032534, International Search Report mailed Sep. 18, 2015", 3 pgs.
"International Application Serial No. PCT/US2015/032534, Written Opinion mailed Sep. 18, 2015", 7 pgs.
"On CSI enhancements for NAICS", Ericsson, (May 10, 2014), 1-3.
"On CSI feedback enhancements in support of NAICS", NVIDIA, (May 9, 2014), 1-6.

* cited by examiner

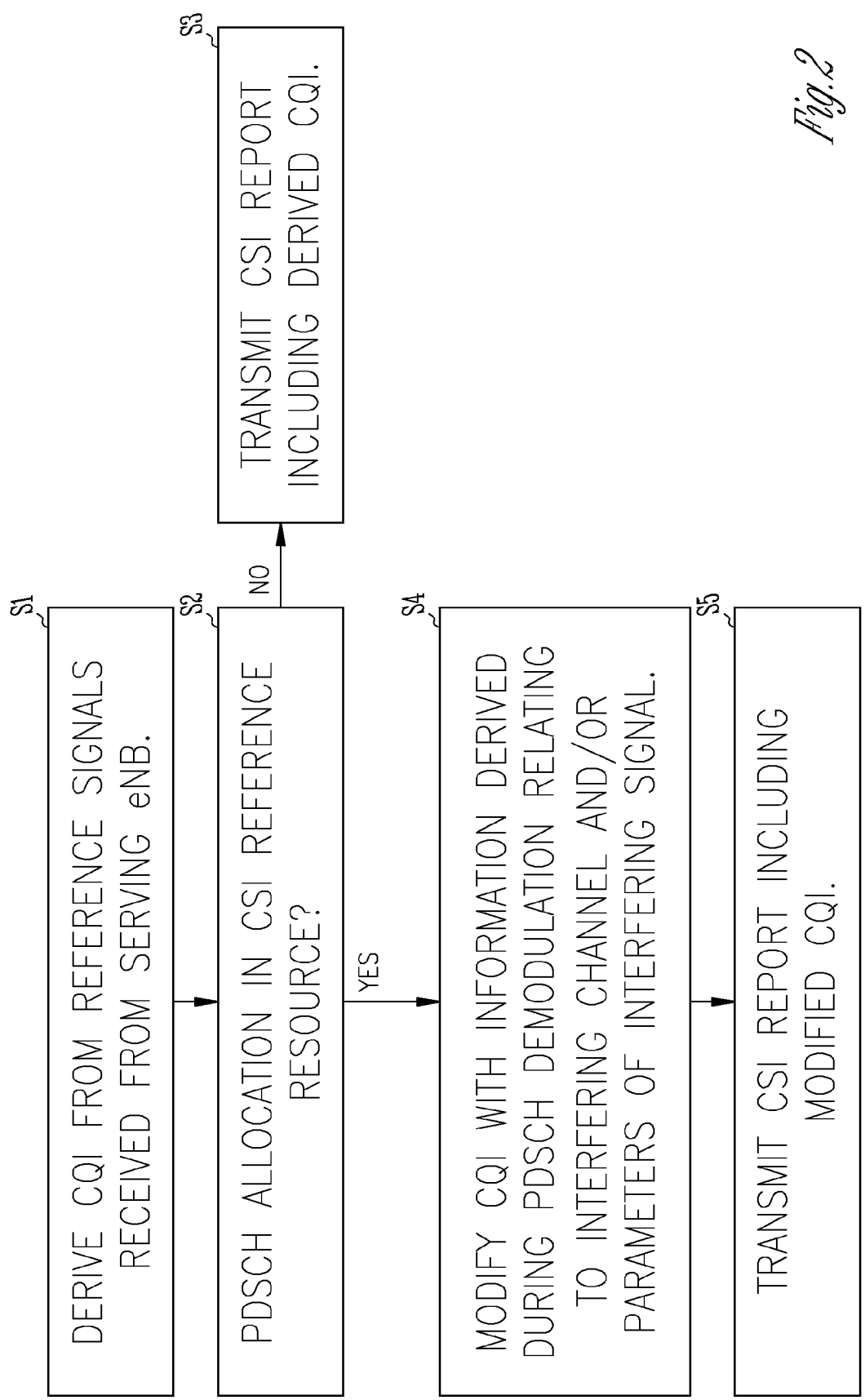

USER EQUIPMENT AND METHODS FOR CSI ENHANCEMENTS USING INTERFERENCE CANCELLATION AND SUPPRESSION RECEIVERS

PRIORITY CLAIM

This application claims priority to U.S. Provisional Patent Application Ser. No. 62/015,903, filed Jun. 23, 2014 which is incorporated herein by reference in its entirety

TECHNICAL FIELD

Embodiments pertain to wireless communications. Some embodiments relate to cellular networks including networks operating in accordance with the 3GPP LTE and LTE-A standards. Some embodiments relate to small-cell deployment. Some embodiments relate to 5G cellular networks.

BACKGROUND

In LTE (Long Term Evolution, including Long Term Evolution-Advanced or LTE-A), a base station (an evolved Node B or eNB in LTE terminology) performs channel-dependent scheduling and link adaptation where the transmission parameters used to transmit data to a terminal (a user equipment or UE in LTE terminology), such as transmission power and the modulation and coding scheme (MCS), are dynamically adjusted. For this purpose, a UE provides the eNB with channel state information (CSI) in the form of CSI reports. Accurate reporting of CSI by the UE is essential for effective link adaptation of the downlink. The primary concern of the present disclosure is how CSI reporting may be performed by a UE with an NAICS (network assisted interference cancellation and suppression) receiver.

BRIEF DESCRIPTION OF THE DRAWINGS

FIG. 2 illustrates an example of a procedure followed by a UE with NAICS capability to derive a channel quality indicator in accordance with some embodiments.

DETAILED DESCRIPTION

Figure 1:
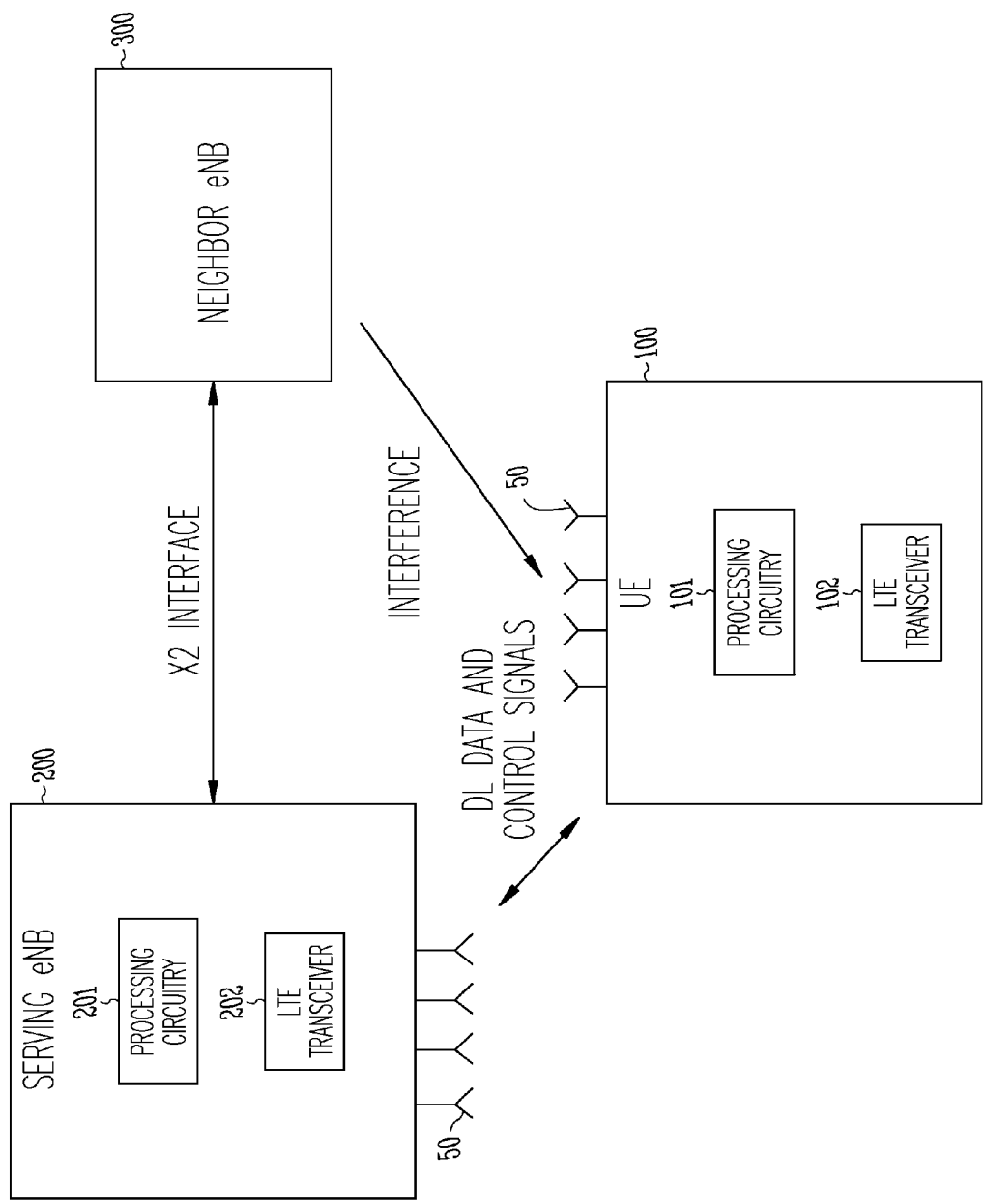
FIG. 1 illustrates an example of the components in an LTE system in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

To improve the capacity of LTE networks, heterogeneous networks to achieve cell-splitting gains and MU-MIMO (multi-user multi-input multi-output) techniques have been employed. In both scenarios, co-channel interference, either from inter-cell or co-scheduled intra-cell users, may be the dominant limiting factor in achieving higher network capacity. In conventional Release11 systems, interference at a terminal (referred to as user equipment or UE in LTE terminology) is mitigated by using coordinated multi-point techniques (CoMP) at the transmitting base station (i.e., an evolved Node B or eNB in LTE terminology). It has been shown, however, that interference mitigation at the UE side by accounting for spatial properties of the interference may also provide gains in spectral efficiency. An example is the so-called MMSE-IRC (minimum mean squared error interference rejection) receiver.

Further enhancements for interference mitigation at the receiver side may be achieved by using more advanced receiver algorithms, which may utilize additional information about the interference structure. For example, receivers may estimate the interference parameters such as the transmission mode, interference presence, and modulation and coding scheme (MCS), to facilitate advanced interference cancellation and suppression using maximum likelihood (ML) or symbol level interference cancellation (SLIC) techniques. In order to facilitate operation of such receivers, higher-layer signaling assistance relating to the parameters of interfering signals (e.g., a subset of power offset, set of transmission modes, resource allocation and precoding granularity used in neighboring cell) may be provided by the eNB to the UE. Such receivers may be referred to as interference-aware (IA) receivers or (NAICS) receivers.

For the purpose of dynamic channel-dependent scheduling and link adaptation, a UE provides the eNB with channel state information (CSI) in the form of CSI reports. Described below are measures for enabling more accurate CSI reporting by a UE with an NAICS receiver.

FIG. 1 illustrates an example of the components of an LTE network made up of a UE 100 and a serving eNB 200 that provides downlinks (DL) and uplink (UL) resource allocations for the UE 100. The UE 100 includes processing circuitry 101 connected to a radio-frequency (RF) transceiver 102 for providing an LTE interface. The serving eNB 200 includes processing circuitry 201 connected to an RF transceiver 202 for providing an LTE interface. Each of the transceivers in the devices is connected to antennas 50. The processing circuitry in each device may implement a physical layer that uses the RF transceiver to send and receive signals over the wireless medium and a medium access control (MAC) layer for controlling access to the medium. The processing circuitry of the UE may implement an NAICS receiver. The processing circuitry of the UE may include memory arranged to configure the various elements of the UE to perform the operations described herein.

Also shown in FIG. 1 is a neighboring eNB 300 that serves a geographically neighboring cell. The serving eNB 200 and neighboring eNB 300 may communicate via an X2 interface and may time synchronize their respective downlink transmissions. Illustrated in the figure is the situation where downlink transmissions of neighboring eNB 300 may interfere with the downlink transmissions of serving eNB 200 to UE 100. The processing circuitry 101 of UE 100 may be configured with NAICS capability and further configured to derive CSI taking into account the NAICS capability as described below.

The LTE downlink transmission scheme is based on Orthogonal Frequency Division Multiple Access (OFDMA) which converts a single wide-band frequency selective channel into a plurality of frequency-flat subchannels. LTE utilizes multiple antennas for downlink transmission where a particular multi-antenna transmission scheme may be described as a mapping from the output of the data modulation to a set of antenna ports. The input to the antenna mapping consists of the modulation symbols (e.g., QPSK, 16 QAM, 64 QAM) corresponding to the one or two transport blocks of a transmission time interval (TTI), where a transport block refers to how data is organized in the transport channel between the medium access control (MAC) layer and the physical layer of the LTE radio access protocol stack. The output of the antenna mapping is a set of symbols for each antenna port. These symbols are subsequently applied to the OFDM modulator and mapped to resource elements (REs) of the OFDM time-frequency grid corresponding to that antenna port. REs are organized into resource blocks (RBs), in terms of which downlink resources are allocated to the UE by the eNB.

The different multi-antenna transmission schemes used in LTE correspond to different transmission modes of which there are currently ten defined. These transmission modes are designated TM1 through TM10 and differ with respect of the specific structure of the antenna mapping and also with respect to which reference signals are assumed to be used for demodulation and how CSI is acquired by the UE and fed back to the eNB.

A UE utilizes downlink reference signals (RS) in order to acquire CSI information to send to the eNB where downlink reference signals are predefined signals occupying specific resource elements within the downlink time-frequency grid. The LTE specifications include several types of downlink reference signals that differ in the ways they are transmitted and intended to be used. One RS framework used in LTE is based on cell-specific RS (CRS), where a CRS sequence transmitted on every subframe on resources determined by the cell ID of the serving cell that are spread over the entire transmission bandwidth and subframe duration. CRS are intended to be used for CSI estimation and feedback as well as for demodulation of downlink physical channels. Another RS framework, introduced in Release 10, provides separate CSI-RS for CSI estimation and feedback and demodulation RS (DM-RS) for demodulation. CSI-RS are transmitted with a relatively low density with a configurable periodicity over the entire bandwidth, while DM-RS are transmitted with a higher density but only in the resource blocks (RBs) allocated to a particular UE. Release 11 further introduces tools in the CSI-RS framework for better measurement of interference, termed CSI-IM (CSI-interference management) resources. Such CSI-IM resources may include CSI-RS sent with zero power by an eNB.

A UE transmits CSI information to its serving eNB in form of CSI reports that may be sent periodically and aperiodically at the request of the eNB. The CSI report includes a channel quality indication (CQI), where the CQI is defined by the LTE specifications to be the highest CQI index that would result in a PDSCH (physical data shared channel) transport block transmission with BLER (block error rate) of ten percent. As stated in Section 7.2.3 of TS 36.213:

Based on an unrestricted observation interval in time and frequency, the UE shall derive for each CQI value reported in uplink subframe n the highest CQI index between 1 and 15 in Table 7.2.3-1 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

The CQI definition above implies that the reported CQI index should include all UE receiver processing capabilities, including NAICS capability to cancel and suppress interference on the CSI reference resource. While for intra-cell interference (SU-MIMO) the CQI requirements for NAICS can be easily fulfilled due to knowledge of the interfering signal parameters by the UE, the accurate reporting of CQI for inter-cell interference with an NAICS receiver is more problematic. Described below are measures that may be taken to provide more accurate reporting of CSI by a UE with NAICS capability.

In a typical UE implementation, the inter-cell interference for CQI is measured on the serving cell CRS or CSI-IM REs of the CSI reference resource. In principle, this approach could be used for an NAICS receiver. However, the parameter estimation reliability requirements for parameter estimation for NAICS receivers are more stringent, and the lack of the available REs within a PRB pair could make reliable estimation of the inter-cell interfering signal parameters (e.g. modulation order, pre-coding matrix indicator, transmission power) for NAICS more problematic. For example, in TM 1-9 the REs available for parameter estimation would be limited to 12 REs per PRB pair and for TM10 to 4 REs per PRB pair. Potentially, the number of the REs for interference estimation could be increased, and such enhancements (without significant performance loss due to additional overhead) may not be feasible for a CSI-IM based approach. In one embodiment, use of CSI-IM is extended to TM 1-9 and a larger number of REs per one CSI-IM resource (e.g. 8, 12, 16, etc.) is used. It should be noted that in certain CRS configurations which are preferable for NAICS operation (e.g., collided CRS of serving and interfering cells), the interference samples measured on the serving cell CRS REs may not reflect the actual interference conditions seen on the PDSCH.

In another embodiment, the UE utilizes its NAICS receiver capability to measure interference for purposes of computing a CQI. An NAICS receiver mitigates downlink interference by exploiting information available to it that may include parameters of the signals received via higher layer signaling from neighboring eNBs, the interfering effective channel, and signal parameters related to the interfering signal detected from the received signal itself such as symbol alphabet, modulation order, and transmission power. During PDSCH demodulation, the UE with help of higher layer signaling may estimate the interfering effective channel from reference signals of the neighboring cell such as CRS (TM1-6 on neighboring cell) and/or DM-RS (TM7-10 on neighboring cell). By demodulating these reference signals, the UE may estimate the channel corresponding to the interfering signal transmitted by the neighboring cell. Which reference signal, CRS or DM-RS, that should be used by the UE for estimation may be decided upon during PDSCH demodulation. For example, for each PRB pair, the UE may first tries to detect presence of DM-RS of the neighboring cell and use CRS if DM-RS are not present. To estimate the interfering signal parameters, the UE may perform the following procedure during PDSCH demodulation. On the RBs of the scheduled PDSCH, the UE observes a mix of the useful signal (with known parameters from the control signaling of the serving cell) and interfering signals (with unknown parameters). For each RB, the UE scans over possible parameters (e.g., modulation schemes) that may be used in the interfering cell signal and tries to find the most likely one that maximize certain metric (e.g., a likelihood function). When the RB is outside of the scheduled PDSCH resource allocation, the estimation may not be accurate, since UE would not know the parameters of signals from both interfering and serving cells.

In one embodiment, the UE first measures interference for purposes of computing a CQI from reference signals transmitted in a conventional manner. That is, interference is measured as the noise on the reference signal (e.g., CRS or CSI-RS, depending on the transmission mode) by computing the residual after subtracting the reference signal from the received signal in the appropriate resource element. The UE may also utilize CSI-IM resources if operating in TM10 for this initial interference measurement. Subsequently, the interference measurement (or calculated CQI) is modified in accordance with the UE's NAICS receiver capability by determining the interfering signal parameters and interfering effective channel during PDSCH demodulation as described in the preceding paragraph.

In another embodiment, the CSI reference resource definition is extended to the scheduled PDSCH resource allocation (e.g., corresponding to the C-RNTI or cell radio network temporary identifier) of a UE. CSI reporting (including CQI) for such CSI reference resource is then calculated in accordance with interfering signal parameters estimated from the received PDSCH and NAICS receiver capability. If there is no scheduled PDSCH on the CSI reference resource, the UE may report CQI in an unmodified manner such as in accordance with MMSE-IRC receiver capability (i.e., the UE is not expected to use higher layer signaling assistance for NAICS receiver in CQI calculation). This facilitates CQI reports for the receivers in accordance to the actual interference conditions and receiver processing capabilities to cancel and suppress interference.

In another embodiment, the CSI reference resource definition for CQI calculation by a UE with an NAICS receiver is extended only to the resource allocation occupied by the scheduled PDSCH. Then, during PDSCH demodulation, the NAICS receiver estimates the parameters of interfering signals and calculates the appropriate MCS that could lead to the target BLER of 10% for the CSI reference resource associated with PDSCH resource allocation. In case PDSCH resources are not available for the CSI reference resource, the CSI calculation at the UE may fall back to the conventional CSI-IM or CRS based procedures. In that case, the UE may calculate the CQI with reference to a conventional MMSE-IRC receiver without consideration of higher layer signaling provided to enable NAICS processing. That is, the UE would not be expected to use NAICS higher-layer signaling for CQI calculation if the CSI reference resource does not completely overlap in time and frequency with the scheduled PDSCH. A CSI reference resource completely overlaps with the PDSCH if the time-frequency resources of the CSI reference resource are a subset of the resources allocated to the PDSCH.

In another embodiment, the CSI reference resource definition would be limited to the resource allocation of the scheduled PDSCH. In this case, the UE would provide CSI reports for such CSI reference resource. In another embodiment, the CSI reference resource definition would be extended to the resource allocation of the scheduled PDSCH, and the UE would provide a delta MCS report. The delta MCS report would indicate the difference between the actually assigned MCS and the highest MCS estimated at the UE to meet target transport block error rate (BLER) not exceeding 10%.

FIG. 2 illustrates an example of a procedure followed by a UE with NAICS capability for deriving a CQI for including in a CSI report generated either periodically or in response to a request from the serving eNB. At stage S1, the UE derives the CQI based upon reference signals received from the eNB. At stage S2, the UE determines whether a PDSCH allocation is included in the CSI reference resource. If no, the UE calculates transmits the CSI report including the derived CQI at stage S3. If yes, the UE modifies the derived CQI with information derived during PDSCH demodulation relating to interfering channel and/or parameters of the interfering signal at stage S4. A CSI report including the modified CQI is transmitted to the eNB at stage S5.

EXAMPLE EMBODIMENTS

In Example 1, a method for operating a UE (user equipment) comprises: demodulating a PDSCH (physical data shared channel) received from an eNB; computing a channel quality indicator (CQI) based upon reference signals received from the eNB; and, modifying the CQI by estimating interference during PDSCH demodulation using network assisted interference and cancellation (NAICS) signaling received from the eNB. The UE may utilize an NAICS receiver to demodulate the PDSCH.

In Example 2, the subject matter of Example 1 may optionally include modifying the CQI based on an interference estimation performed during PDSCH demodulation by estimating an interfering effective channel from reference signals present in the PDSCH allocation and estimating interfering signal parameters within the PDSCH by using higher layer signaling assistance from neighboring cells relating to parameters of interfering signals and scanning over possible parameters to determine a parameter that is most likely to have been received.

In Example 3, the subject matter of any of the preceding examples may optionally include transmitting a CSI (channel state information) report to the eNB that includes the modified CQI.

In Example 4, the subject matter of any of the preceding examples may optionally include transmitting a CSI (channel state information) report to the eNB that includes the modified CQI if a CSI reference resource defined by the eNB completely overlaps in time and frequency with the resource allocation of the PDSCH.

In Example 5, the subject matter of any of the preceding examples may optionally include transmitting a CSI report to the eNB that does not include the modified CQI if a CSI reference resource defined by the eNB does not completely overlap with the resource allocation of the PDSCH.

In Example 6, the subject matter of any of the preceding examples may optionally include transmitting a CSI (channel state information) report to the eNB that includes the modified CQI with a CSI reference resource definition extended to include the resource allocation of the PDSCH.

In Example 7, the subject matter of any of the preceding examples may optionally include, if there is no scheduled PDSCH on the CSI reference resource, transmitting a CSI report to the eNB with an unmodified CQI.

In Example 8, the subject matter of any of the preceding examples may optionally include transmitting a CSI (channel state information) report to the eNB that includes the modified CQI with a CSI reference resource definition limited to the resource allocation of the PDSCH.

In Example 9, the subject matter of any of the preceding examples may optionally include transmitting a CSI (channel state information) report to the eNB that includes the modified CQI with a CSI reference resource definition extended to the resource allocation of the PDSCH, wherein the CSI report includes the modified CQI as a delta MCS (modulation and coding scheme) that indicates the difference between an actually assigned MCS and the highest MCS estimated at the UE to meet a target BLER (block error rate) of 10%.

In Example 10, UE comprises a radio transceiver for communicating with an eNB (evolved Node B) and processing circuitry to perform any of the methods recited in Examples 1 through 9.

In Example 11, a non-transitory computer-readable storage medium contains instructions for execution by one or more processors of a UE to perform operations to configure the UE perform any of the methods recited in Examples 1 through 9.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

In some embodiments, the UE may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

One or more of the functional elements of a UE or eNB may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, a UE or eNB (FIG. 1) and may be configured to transmit and/or receive orthogonal frequency division multiplexed (OFDM) communication signals over a multicarrier communication channel in accordance with an orthogonal frequency division multiple access (OFDMA) technique. The OFDM signals may comprise a plurality of orthogonal subcarriers. In some broadband multicarrier embodiments, the UEs and eNBs may be part of a cellular broadband wireless access (BWA) network communication network, such a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect.

In some other embodiments, the UE or eNB may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A UE (user equipment) comprising:
a radio transceiver for communicating with an eNB (evolved Node B);
processing circuitry to:
demodulate a PDSCH (physical data shared channel) received from the eNB;
compute a channel quality indicator (CQI) based upon reference signals received from the eNB;
modify the CQI by estimating interference during PDSCH demodulation using network assisted interference and cancellation (NAICS) signaling received from the eNB; and,
transmit a CSI (channel state information) report to the eNB that includes the modified CQI with a CSI reference resource definition extended to include the resource allocation of the PDSCH.

2. The UE of claim 1 wherein the processing circuitry is to modify the CQI based on an interference estimation performed during PDSCH demodulation by estimating an interfering effective channel from reference signals present in the PDSCH allocation and estimating interfering signal parameters within the PDSCH by using higher layer signaling assistance from neighboring cells relating to parameters of interfering signals and scanning over possible parameters to determine a parameter that is most likely to have been received.

3. The UE of claim 1 wherein the processing circuitry is to configure the transceiver to transmit a CSI (channel state information) report to the eNB that includes the modified CQI if a CSI reference resource defined by the eNB completely overlaps in time and frequency with the resource allocation of the PDSCH.

4. The UE of claim 3 wherein the processing circuitry is to configure the transceiver to transmit a CSI report to the eNB with an unmodified CQI if a CSI reference resource defined by the eNB does not completely overlap with the resource allocation of the PDSCH.

5. The UE of claim 1 wherein, if there is no scheduled PDSCH on the CSI reference resource, the processing circuitry is to configure the transceiver to transmit a CSI report to the eNB that does not include the modified CQI.

6. The UE of claim 1 wherein the processing circuitry is to configure the transceiver to transmit a CSI (channel state information) report to the eNB that includes the modified CQI with a CSI reference resource definition limited to the resource allocation of the PDSCH.

7. The UE of claim 1 wherein the processing circuitry is to configure the transceiver to transmit a CSI (channel state information) report to the eNB that includes the modified CQI with a CSI reference resource definition extended to a resource allocation of the PDSCH, wherein the CSI report includes the modified CQI as a delta MCS (modulation and coding scheme) that indicates the difference between an actually assigned MCS and the highest MCS estimated at the UE to meet a target BLER (block error rate).

8. A method for operating a UE (user equipment) comprising:

demodulating a PDSCH (physical data shared channel) received from the eNB;
computing a channel quality indicator (CQI) based upon reference signals received from the eNB;
modifying the CQI by estimating interference during PDSCH demodulation using network assisted interference and cancellation (NAICS) signaling received from the eNB; and,
transmitting a CSI (channel state information) report to the eNB that includes the modified CQI with a CSI reference resource definition extended to include the resource allocation of the PDSCH.

9. The method of claim 8 further comprising modifying the CQI based on an interference estimation performed during PDSCH demodulation by estimating an interfering effective channel from reference signals present in the PDSCH allocation and estimating interfering signal parameters within the PDSCH by using higher layer signaling assistance from neighboring cells relating to parameters of interfering signals and scanning over possible parameters to determine a parameter that is most likely to have been received.

10. The method of claim 8 further comprising transmitting a CSI (channel state information) report to the eNB that includes the modified CQI if a CSI reference resource defined by the eNB completely overlaps in time and frequency with the resource allocation of the PDSCH.

11. The method of claim 10 further comprising transmitting a CSI report to the eNB with an unmodified CQI if a CSI reference resource defined by the eNB does not completely overlap with the resource allocation of the PDSCH.

12. The method of claim 8 further comprising, if there is no scheduled PDSCH on the CSI reference resource, transmitting a CSI report to the eNB that does not include the modified CQI.

13. The method of claim 8 further comprising transmitting a CSI (channel state information) report to the eNB that includes the modified CQI with a CSI reference resource definition limited to the resource allocation of the PDSCH.

14. The method of claim 8 further comprising transmitting a CSI (channel state information) report to the eNB that includes the modified CQI with a CSI reference resource definition extended to a resource allocation of the PDSCH, wherein the CSI report includes the modified CQI as a delta MCS (modulation and coding scheme) that indicates the difference between an actually assigned MCS and the highest MCS estimated at the UE to meet a target BLER (block error rate).

15. A non-transitory computer-readable storage medium that stores instructions for execution by one or more processors of a user equipment to perform operations to configure a UE (user equipment) to:
estimate interference during demodulation of a PDSCH (physical data shared channel) received from the eNB using network assisted interference cancellation and suppression (NAICS) higher layer signaling assistance from neighboring cells;
compute a channel quality indicator (CQI) based upon reference signals received from the eNB where the CQI is modified in accordance with the estimated interference; and,
transmit a CSI (channel state information) report to the eNB that includes the modified CQI with a CSI reference resource definition extended to include the resource allocation of the PDSCH.

16. The medium of claim 15 further comprising stored instructions to modify the CQI based on an interference estimation performed during PDSCH demodulation by estimating an interfering effective channel from reference signals present in the PDSCH allocation and estimating interfering signal parameters within the PDSCH by scanning over possible parameters by determining a parameter that is most likely to have been received.

* * * * *